United States Patent
Fujii et al.

(10) Patent No.: US 10,013,882 B2
(45) Date of Patent: Jul. 3, 2018

(54) LANE CHANGE ASSISTANCE DEVICE

(71) Applicant: HONDA MOTOR CO., LTD., Tokyo (JP)

(72) Inventors: Satoshi Fujii, Wako (JP); Haruhiko Nishiguchi, Wako (JP); Daisuke Kubota, Wako (JP); Ryohsaku Arakawa, Wako (JP); Idhsada Sanguanwongthong, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 15 days.

(21) Appl. No.: 15/435,727

(22) Filed: Feb. 17, 2017

(65) Prior Publication Data
US 2017/0243491 A1  Aug. 24, 2017

(30) Foreign Application Priority Data
Feb. 19, 2016 (JP) .................... 2016-029519

(51) Int. Cl.
*G08G 1/16* (2006.01)
*B60W 30/12* (2006.01)

(52) U.S. Cl.
CPC ............. *G08G 1/167* (2013.01); *B60W 30/12* (2013.01)

(58) Field of Classification Search
CPC ............ B60R 21/0134; G06K 9/00798; G06K 9/00791; B60W 30/0956; B60W 30/18163; B60W 30/12; A01B 12/006; G08G 1/167
USPC .................................. 340/937, 905; 348/148
See application file for complete search history.

(56) References Cited

U.S. PATENT DOCUMENTS

| | | | | |
|---|---|---|---|---|
| 6,577,334 B1* | 6/2003 | Kawai | ................ | B60G 17/0165 348/148 |
| 6,882,287 B2* | 4/2005 | Schofield | ............... | B60Q 1/346 340/435 |
| 7,218,207 B2* | 5/2007 | Iwano | ................ | G06K 9/00798 340/435 |
| 8,108,134 B2* | 1/2012 | Kageyama | .......... | B60R 21/0134 382/104 |
| 8,219,298 B2* | 7/2012 | Nishira | .............. | B60K 31/0008 701/1 |
| 8,244,408 B2* | 8/2012 | Lee | ................... | B60W 30/0953 180/169 |
| 8,311,729 B2* | 11/2012 | Saito | .................... | B62D 15/025 701/117 |

(Continued)

FOREIGN PATENT DOCUMENTS

JP    2015-85887 A    5/2015

*Primary Examiner* — Hai Phan
*Assistant Examiner* — Son M Tang
(74) *Attorney, Agent, or Firm* — Westerman, Hattori, Daniels & Adrian, LLP

(57) ABSTRACT

A surrounding information acquisition section and a recognition unit (a surrounding detection unit) detect a first position (a change position) at which the type of a lane mark is switched. A lane change determination unit outputs a determination result whether lane change is available or unavailable on the basis of the type of the lane mark ahead of the first position to a notification mechanism (a notification unit) at a time point at which a vehicle has reached a predetermined range including the first position. The notification mechanism makes notification of the determination result.

18 Claims, 9 Drawing Sheets

(56) References Cited

U.S. PATENT DOCUMENTS

| | | | | |
|---|---|---|---|---|
| 8,559,675 B2* | 10/2013 | Nogami | B60R 1/00 | 180/167 |
| 8,718,861 B1* | 5/2014 | Montemerlo | B60W 30/00 | 701/26 |
| 9,132,837 B2* | 9/2015 | Schlensag | B60W 40/06 | |
| 9,230,183 B2* | 1/2016 | Bechtel | B60R 1/04 | |
| 9,463,744 B2* | 10/2016 | Schofield | B60Q 1/346 | |
| 9,722,902 B2* | 8/2017 | Oooka | H04L 43/0888 | |
| 9,756,174 B2* | 9/2017 | Kohler | H04M 1/72577 | |
| 2001/0056326 A1* | 12/2001 | Kimura | G01C 21/30 | 701/446 |
| 2006/0287812 A1* | 12/2006 | Takashima | G01C 7/04 | 701/446 |
| 2009/0167864 A1* | 7/2009 | Unoura | G06K 9/00798 | 348/148 |
| 2010/0138115 A1* | 6/2010 | Kageyama | B60R 21/0134 | 701/46 |
| 2010/0228420 A1* | 9/2010 | Lee | B62D 1/28 | 701/26 |
| 2012/0065878 A1* | 3/2012 | Yeh | G01C 21/32 | 701/400 |
| 2012/0226392 A1* | 9/2012 | Kataoka | G08G 1/167 | 701/1 |
| 2013/0151145 A1* | 6/2013 | Ishikawa | G01C 21/3667 | 701/428 |
| 2014/0067250 A1* | 3/2014 | Bone | G08G 1/167 | 701/301 |
| 2014/0236473 A1* | 8/2014 | Kondo | G01C 21/3647 | 701/400 |
| 2015/0197249 A1* | 7/2015 | Sakima | B60W 30/165 | 701/96 |
| 2015/0300834 A1* | 10/2015 | Shin | G01C 21/3602 | 701/523 |
| 2015/0325127 A1* | 11/2015 | Pandita | G08G 1/16 | 701/431 |
| 2015/0367778 A1* | 12/2015 | Vladimerou | G06K 9/00798 | 348/148 |
| 2016/0016584 A1* | 1/2016 | Pfeiffer | B60W 30/16 | 701/34.1 |
| 2016/0046290 A1* | 2/2016 | Aharony | G06K 9/00798 | 701/41 |
| 2016/0110617 A1* | 4/2016 | Kawasaki | G06K 9/00798 | 348/148 |
| 2016/0140401 A1* | 5/2016 | Ishigami | B60W 30/10 | 348/148 |
| 2017/0036678 A1* | 2/2017 | Takamatsu | B60W 10/04 | |
| 2017/0240172 A1* | 8/2017 | Nishiguchi | B60W 30/12 | |

* cited by examiner

LANE CHANGE ASSISTANCE DEVICE

CROSS REFERENCES TO RELATED APPLICATIONS

The present application claims priority under 35 U.S.C. § 119 to Japanese Patent Application No. 2016-029519, filed Feb. 19, 2016, entitled "Lane Change Support Device." The contents of this application are incorporated herein by reference in their entirety.

TECHNICAL FIELD

The present disclosure relates to a lane change assistance device that automatically determines whether lane change is available or unavailable in accordance with the type of a lane mark.

BACKGROUND

Japanese Unexamined Patent Application Publication No. 2015-085887 (Abstract, paragraphs [0023] to [0026]) provides a drive assistance system that moves a vehicle to the leftmost lane by automatic control and then stops the vehicle if an abnormal situation occurs in the health condition of a driver. This system recognizes a lane mark on the left of a travel road on the basis of captured image information of a camera that captures an image at the front of the vehicle if an abnormal situation occurs in the health condition of the driver. Then, the system changes the lane to the left lane by automatic control if the type of the lane mark is a broken line, and stops the vehicle if the type of the lane mark is not a broken line.

The drive assistance system that changes the lane by the recognition of the broken line as a trigger has various problems as follows. When the vehicle is located at a position before a position at which the type of the lane mark is switched from a slid line to a broken line, the drive assistance system provided therein recognizes a broken line ahead of the switching position. For example, if the camera has high detection accuracy or high recognition accuracy, the camera recognizes the broke line at a time point at which a long distance is still left to the switching position. Then, lane change control may be started although the long distance is still left to the broken line. The driver may feel uncomfortable with such a lane change operation.

SUMMARY

It is desirable to provide a lane change assistance device that allows lane change to be executed at a proper time point corresponding to switching of the type of a lane mark.

According to a first aspect of the embodiment, a lane change assistance device includes a surrounding detection unit that detects a surrounding situation of a vehicle; a lane keep controller that executes lane keep control on the basis of a detection result of a lane mark by the surrounding detection unit; a lane change determination unit that determines whether lane change is available or unavailable on the basis of the detection result of the lane mark by the surrounding detection unit during the lane keep control by the lane keep controller; and a notification unit that makes notification of a determination result by the lane change determination unit. The surrounding detection unit detects a change position at which a type of the lane mark is switched. The lane change determination unit outputs a determination result whether the lane change is available or unavailable on the basis of the type of the lane mark ahead of the change position to the notification unit at a time point at which the vehicle has reached a predetermined range including the change position and extending toward the vehicle.

With the first aspect of the embodiment, the notification about whether the lane change is available or unavailable is made at a proper time point corresponding to switching of the type of the lane mark. For example, if the type of the lane mark ahead of the change position is a broken line, the notification about that the lane change is available is not made until a time point the vehicle enters the predetermined range, and hence the driver does not perform an operation of the lane change. Then, the notification about that the lane change is available is made when the vehicle enters the predetermined range, and hence the driver can change the lane by automatic control or manual control according to the notification. Also, for example, if the type of the lane mark ahead of the change position is a solid line, the notification about that the lane change is available is made until the time point the vehicle enters the predetermined range, and hence the driver can change the lane by automatic control or manual control according to the notification. Then, the notification about that the lane change is available is not made when the vehicle enters the predetermined range, and the driver does not perform the operation for the lane change. In this way, since the operation of the lane change can be made at a proper position, the driver no longer feels uncomfortable with the lane change motion.

According to the first aspect of the embodiment, the change position may be a first position, and a position before the first position by a predetermined distance may be a second position. The lane change determination unit may output the determination result whether the lane change is available or unavailable on the basis of the type of the lane mark ahead of the first position to the notification unit at a time point at which the vehicle has reached the second position.

For example, if the type of the lane mark ahead of the first position is the broken line, as long as the driver performs a lane change operation in response to the notification, the lane can be changed without a noticeable delay at the first position. Also, for example, if the type of the lane mark ahead of the first position is the solid line, the driver can perform the lane change operation until the notification that the lane change is available is no longer made. In this case, the lane can be changed up to a position immediately before the first position. Accordingly, the driver no longer feels uncomfortable with the lane change motion.

In the first aspect of the embodiment, the lane change assistance device may further include a vehicle speed sensor that detects a vehicle speed of the vehicle. The lane change determination unit may set the second position in accordance with the vehicle speed detected by the vehicle speed sensor. By setting the second position in accordance with the vehicle speed, the second position can be accurately set.

According to a second aspect of the embodiment, a lane change assistance device includes a surrounding detection unit that detects a surrounding situation of a vehicle; a lane keep controller that executes lane keep control on the basis of a detection result of a lane mark by the surrounding detection unit; a lane change determination unit that determines whether lane change is available or unavailable on the basis of the detection result of the lane mark by the surrounding detection unit during the lane keep control by the lane keep controller; and a lane change controller that executes lane change control if the lane change determination unit determines that the lane change is available. The surrounding detection unit detects a change position at which a type of the lane mark is switched. If the lane change determination unit determines that the lane change is available on the basis of the type of the lane mark ahead of the change position, the lane change controller starts the lane change control at a time point at which the vehicle has reached a predetermined range including the change position and extending toward the vehicle, and in contrast, if the lane change determination unit determines that the lane change is unavailable on the basis of the type of the lane mark ahead of the change position, the lane change controller does not execute the lane change control at the time point at which the vehicle has reached the predetermined range including the change position.

With the second aspect of the embodiment, the lane change control is executed at a proper time point corresponding to switching of the type of the lane mark. For example, if the type of the lane mark ahead of the change position is the broken line, the lane change control is not executed even if the lane change operation is performed before the vehicle enters the predetermined range. Then, when the vehicle enters the predetermined range, the lane change control is executed. Also, for example, if the type of the lane mark ahead of the change position is the solid line, the lane change control is executed as long as the lane change operation is performed before the vehicle enters the predetermined range. Then, when the vehicle enters the predetermined range, the lane change control is not executed even if the lane change operation is performed. In this way, since the lane change control is executed or no longer executed at a proper position, the driver no longer feels uncomfortable with the lane change motion.

In the second aspect of the embodiment, the change position may be a first position, and a position before the first position by a predetermined distance is a second position. If the lane change determination unit determines that the lane change is available on the basis of the type of the lane mark ahead of the first position, the lane change controller may start the lane change control at a time point at which the vehicle has reached the second position, and in contrast, if the lane change determination unit determines that the lane change is unavailable on the basis of the type of the lane mark ahead of the first position, the lane change controller may not execute the lane change control at the time point at which the vehicle has reached the second position.

For example, if the type of the lane mark ahead of the first position is the broken line, the lane can be changed without a noticeable delay at the first position. Also, for example, if the type of the lane mark ahead of the first position is the solid line, the lane can be changed up to a position immediately before the first position. Accordingly, the driver no longer feels uncomfortable with the lane change motion.

In the second aspect of the embodiment, the lane change assistance device may further include a vehicle speed sensor that detects a vehicle speed of the vehicle. The lane change determination unit may set the second position in accordance with the vehicle speed detected by the vehicle speed sensor. By setting the second position in accordance with the vehicle speed, the second position can be accurately set.

In the second aspect of the embodiment, the lane change assistance device may further include an operation detection unit that detects a lane change operation performed by a driver. If the operation detection unit detects the lane change operation and if the lane change determination unit determines that the lane change is available on the basis of the type of the lane mark ahead of the first position, the lane change controller may start the lane change control at the time point at which the vehicle has reached the second position. With this configuration, even if the vehicle change operation is performed before the vehicle reaches the second position, the lane change control is not executed. Then, the lane change control is executed at the time point at which the vehicle has reached the second position. In this way, since the lane change control is executed at a proper position, the driver no longer feels uncomfortable with the lane change motion.

BRIEF DESCRIPTION OF THE DRAWINGS

The advantages of the disclosure will become apparent in the following description taken in conjunction with the following drawings.

DETAILED DESCRIPTION

A lane change assistance device according to this application is described in detail below along with desirable embodiments with reference to the accompanying drawings.

1. Definitions

Figure 3:
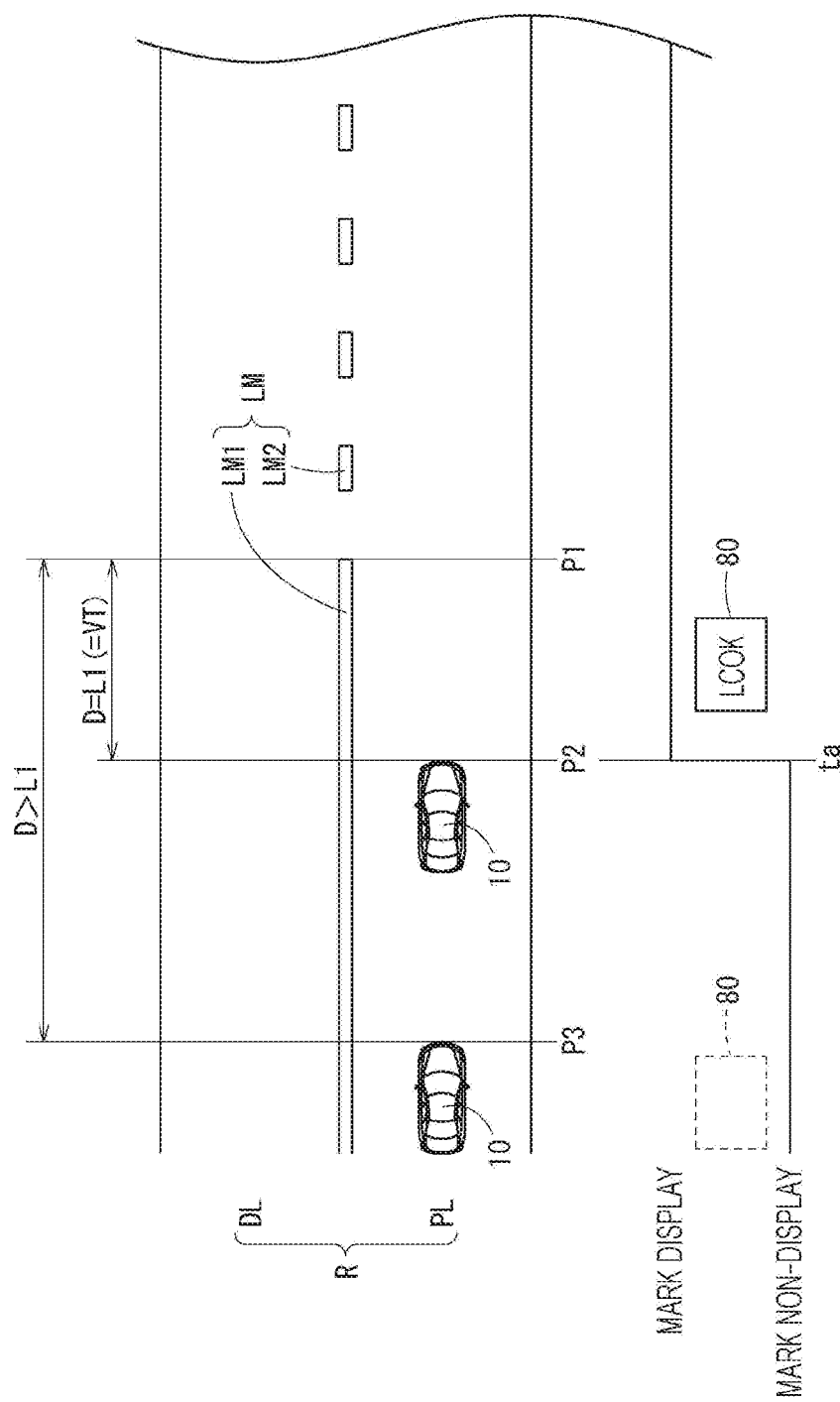
FIG. 3 is an explanatory view for description on notification about lane change availability if a lane mark ahead of a first position is a broken line.
Figure 4:
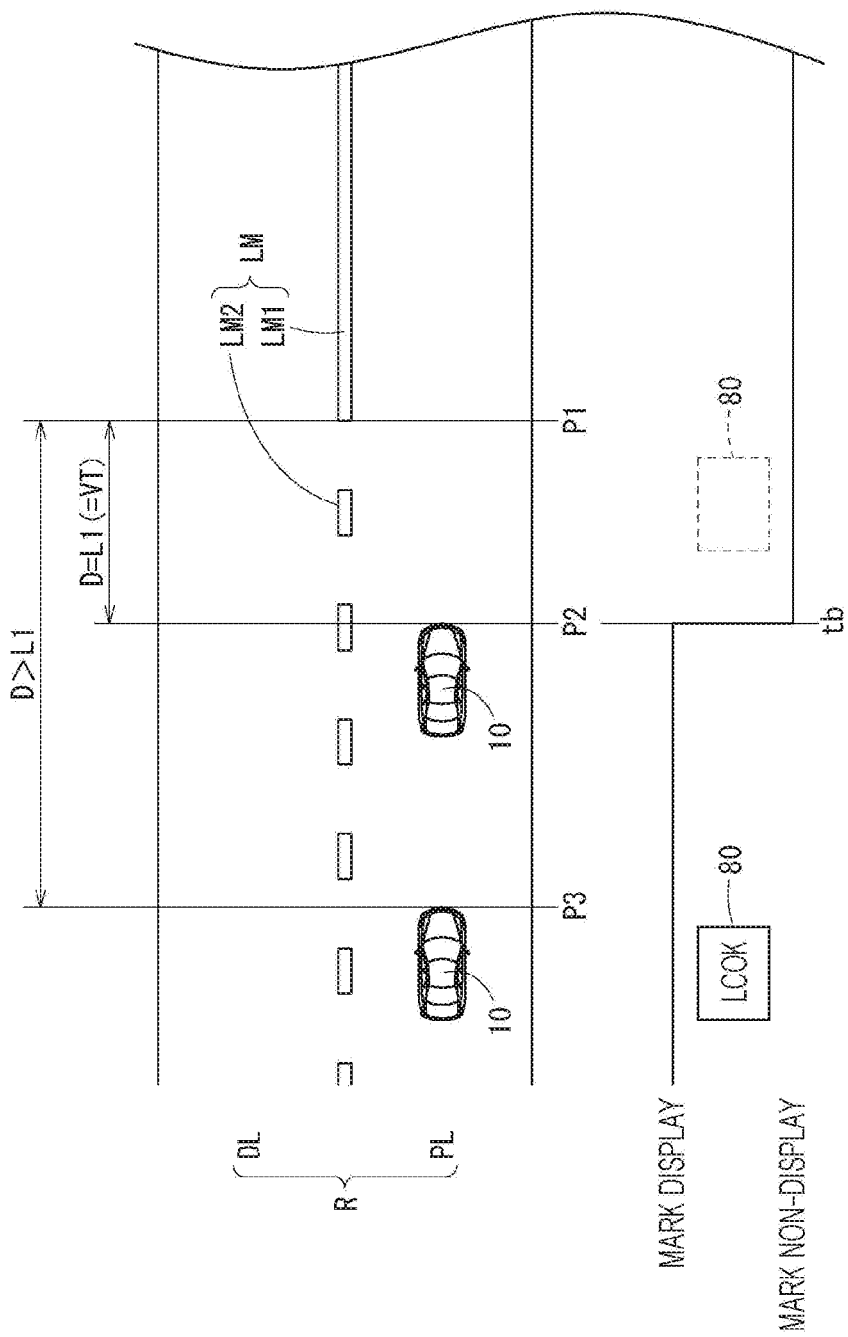
FIG. 4 is an explanatory view for description on notification about lane change availability if a lane mark ahead of the first position is a solid line.
Figure 8:
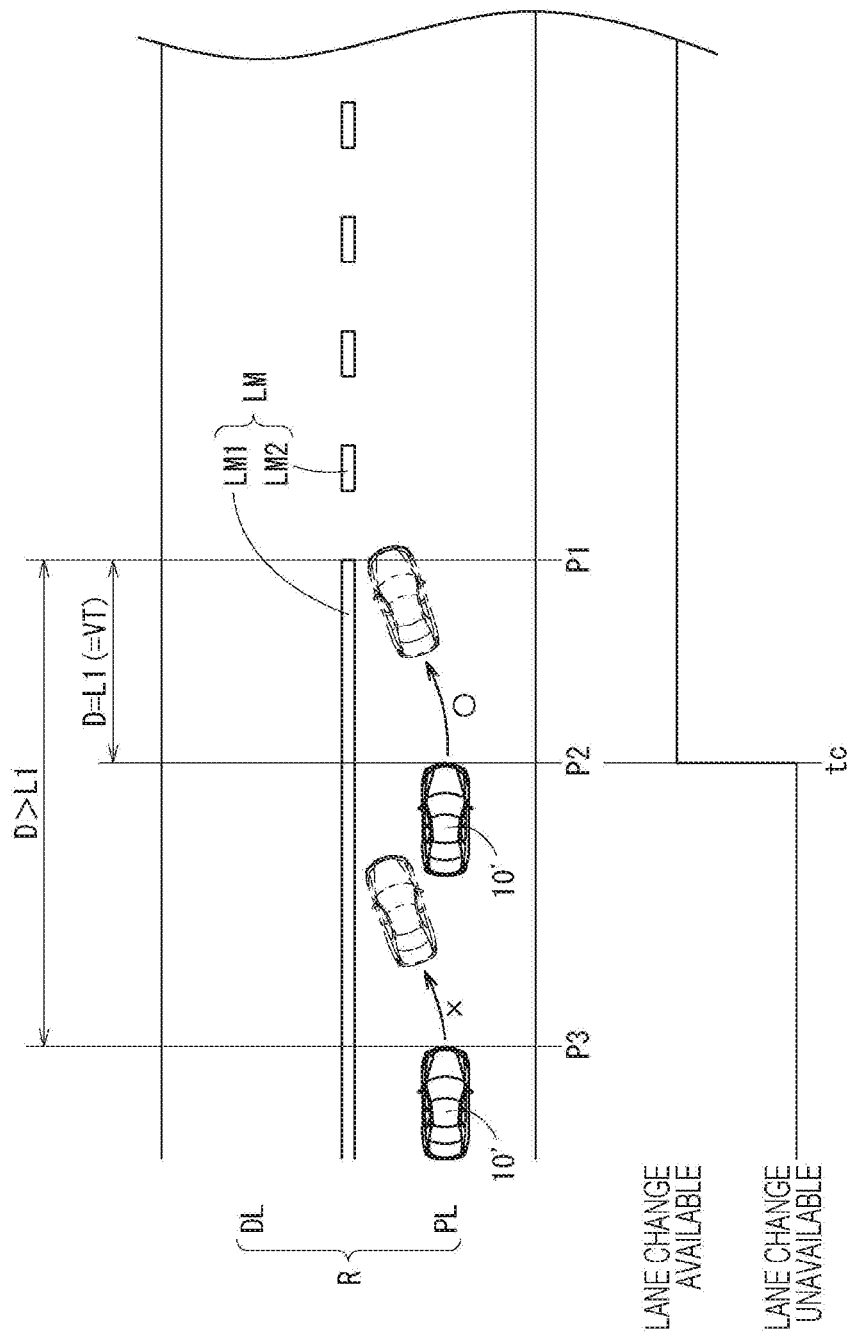
FIG. 8 is an explanatory view for description on lane change control if a lane mark ahead of a first position is a broken line.
Figure 9:
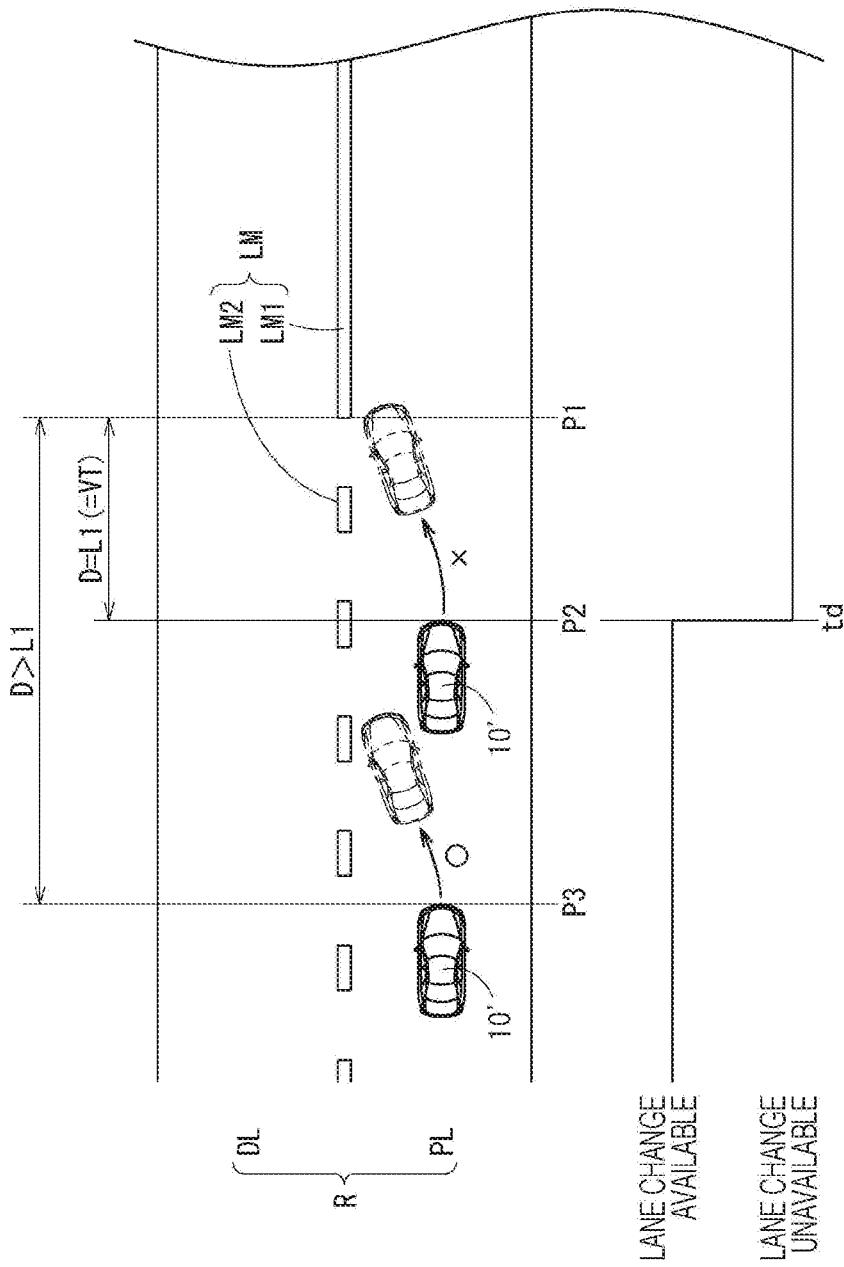
FIG. 9 is an explanatory view for description on the lane change control if a lane mark ahead of the first position is a solid line.

First, terms used in this specification are defined with reference to FIG. 3 (or FIG. 4, FIG. 8, or FIG. 9). A travel road R of a vehicle 10 includes a passing lane PL and a driving lane DL. A lane mark LM is provided between the passing lane PL and the driving lane DL. The types of lane marks LM include a solid line LM1 across which lane change (protrusion) is inhibited, and a broken line LM2 across which lane change is allowed. A change position at which the type of the lane mark LM is changed from one to the other, that is, a position at which the type is switched from the solid line LM1 to the broken line LM2 or from the broken line LM2 to the solid line LM1 is defined as first position P1. Also, a position before (on the vehicle 10 side of) the first position P1 by a predetermined distance L1 is defined as second position P2. In this case, the predetermined distance L1 represents a distance by which the vehicle 10 travels in a period from start of lane change (steering) to start of crossing the lane mark LM during traveling at a constant speed in the passing lane PL (or the driving lane DL). That is, the second position P2 is a border position at which availability of start of lane change control is switched. The predetermined distance L1 is obtained by multiplication of a vehicle speed V and a coefficient T (V×T). The coefficient T is defined as a time required in a period from the start of the lane change (steering) by the vehicle 10 to the start of crossing the lane mark LM. In this embodiment, a constant value is set for the coefficient T. Also, a range including the first position P1 and extending toward the vehicle 10, or more specifically, a range from the first position P1 to the second position P2 is defined as predetermined range.

2. First Embodiment

2-1. Configuration of Lane Change Assistance Device 12

Figure 1:
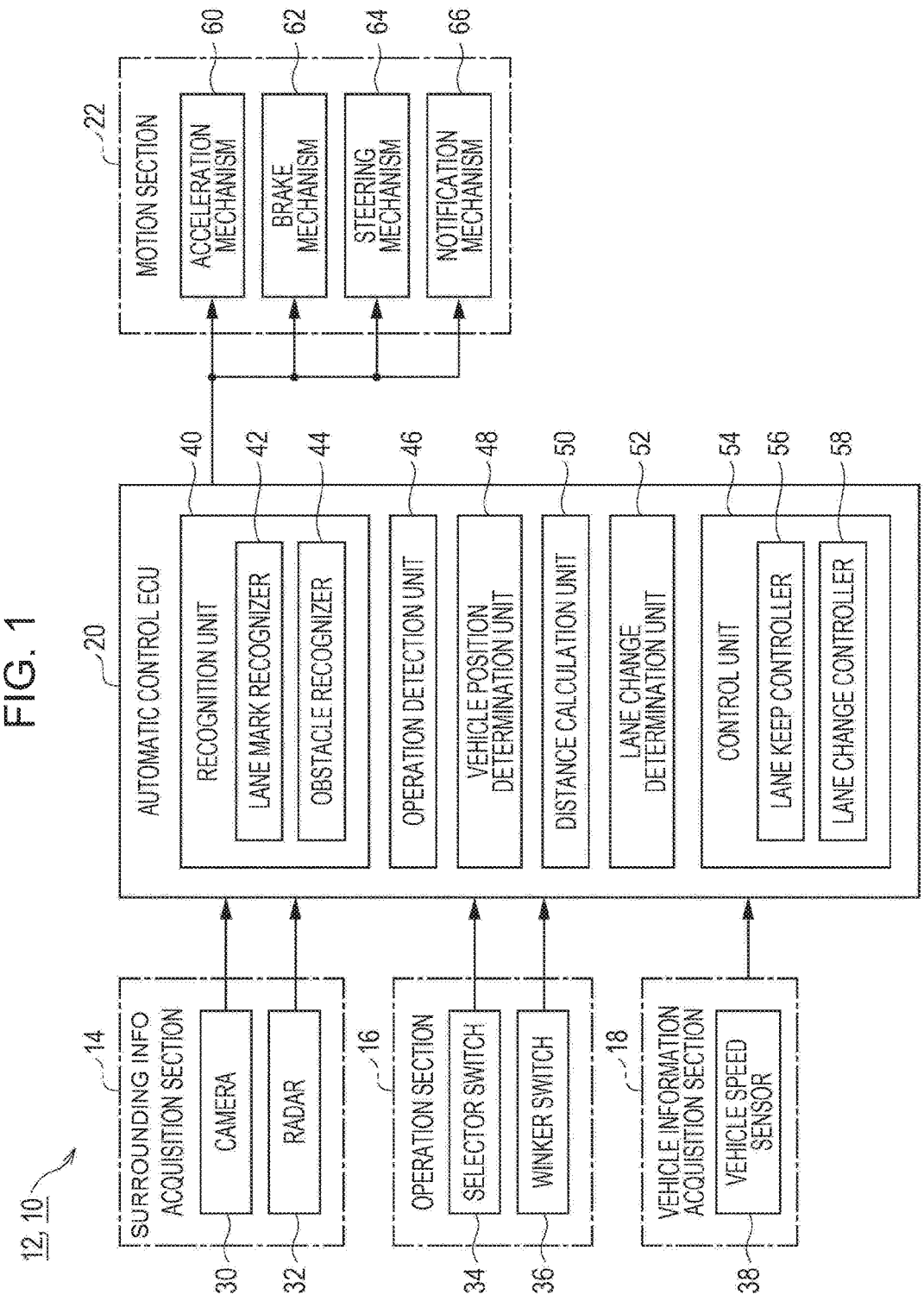
FIG. 1 is a block diagram of a lane change assistance device according to a first embodiment.

A configuration of a lane change assistance device 12 according to a first embodiment is described with reference to FIG. 1. The lane change assistance device 12 is provided in the vehicle 10. The lane change assistance device 12 includes a surrounding information acquisition section 14 that acquires information required for automatic control (including semiautomatic control), an operation section 16, a vehicle information acquisition section 18, an automatic control ECU 20 that executes automatic control, and a motion section 22 that operates according to automatic control.

The surrounding information acquisition section 14 includes a camera 30 and a plurality of radars 32. The camera 30 is provided to face the front of the vehicle 10 so that the camera 30 can capture an image at the front of the vehicle 10, including a travel road R (see FIG. 3). As the camera 30, for example, a monocular camera, a stereo camera, or an infrared camera may be used. The camera 30 outputs captured image information to the automatic control ECU 20. The plurality of radars 32 are provided to face the front, left, right, rear, and other directions of the vehicle 10 so that the radars 32 can detect an obstacle in the surrounding of the vehicle 10. As the radars 32, for example, millimeter-wave radars, micrometer-wave radars, or laser radars may be used. The radars 32 output obstacle information (position information, distance information) to the automatic control ECU 20. Also, a fusion sensor that integrates the captured image information acquired by the camera 30 and the obstacle information acquired by the radars 32 may be used.

The operation section 16 includes a selector switch 34 and a winker switch 36 that are operated by a driver. The selector switch 34 is provided at an instrumental panel or a steering wheel, and outputs an instruction signal or a cancel signal for lane keep control to the automatic control ECU 20 in response to an operation by the driver. In the following description, the instruction signal for the lane keep control is referred to as lane keep signal, and the cancel signal for the lane keep control is merely referred to as cancel signal. The winker switch 36 outputs a leftward or rightward instruction signal for lane change control to the automatic control ECU 20 in response to a winker operation by the driver. In the following description, the instruction signal for the lane change control is referred to as lane change signal.

The vehicle information acquisition section 18 includes various sensors and various devices that acquire vehicle motion information required for the lane keep control and the lane change control. To be specific, the vehicle information acquisition section 18 includes a vehicle speed sensor 38 that detects a vehicle speed V of the vehicle 10, and in addition, includes an acceleration sensor, a yaw rate sensor, a steering angle sensor, a positioning device, and a car navigation device (either not shown). The sensors and devices output acquired vehicle information to the automatic control ECU 20.

The automatic control ECU 20 is a calculator including a microcomputer, and includes a CPU, a ROM (including an EEPROM), a RAM, input/output devices, such as an A/D converter and a D/A converter, and other devices. The automatic control ECU 20 functions as various function realization units when the CPU reads out programs stored in the ROM and executes the programs. In this embodiment, the automatic control ECU 20 functions as a recognition unit 40, an operation detection unit 46, a vehicle position determination unit 48, a distance calculation unit 50, a lane change determination unit 52, and a control unit 54 by executing the programs. The automatic control ECU 20 may be divided into plural portions, or may be integrated with another ECU. Alternatively, all the functions or part of the functions may be realized by hardware.

The recognition unit 40 includes a lane mark recognizer 42 and an obstacle recognizer 44. The lane mark recognizer 42 is configured to recognize a lane mark LM (see FIG. 3) on the travel road R on the basis of the captured image information acquired by the camera 30. Further, the lane mark recognizer 42 is configured to recognize the type of the lane mark LM (the solid line LM1, broken line 1242), and detect the first position P1 at which the type is switched. The lane mark LM can be recognized by existing image analysis. The obstacle recognizer 44 is configured to recognize the obstacle (the other vehicle) present in the surrounding of the vehicle 10 on the basis of the obstacle information acquired by the radars 32, and calculate the position and distance of the obstacle. Also, the obstacle recognizer 44 is configured to calculate a time to contact TTC on the basis of the relative speed and following-distance of the vehicle 10 with respect to the obstacle (the other vehicle). The surrounding information acquisition section 14 and the recognition unit 40 correspond to a surrounding detection unit that detects a surrounding situation of the vehicle 10.

The operation detection unit 46 is configured to detect various operations performed by the driver. In this case, the operation detection unit 46 is configured to detect the lane keep signal, the cancel signal, and the lane change signal output from the operation section 16.

The vehicle position determination unit 48 is configured to calculate a distance D from the first position P1, at which the type of the lane mark LM is switched, to the vehicle 10. Also, the vehicle position determination unit 48 is configured to determine a position before (on the vehicle 10 side of) the first position P1 by the distance D, as a vehicle position. The calculation of the distance D between the first position P1 and the vehicle 10 can use a known technology. For example, if the camera 30 is a monocular camera, a motion stereo method or other method may be used. Also, by previously storing the length of a white-line section and the length of a space section of the broken line LM2, the distance between the first position P1, at which the type is switched from the solid line LM1 to the broken line LM2, and the vehicle 10 can be calculated. In this case, the number of white-line sections and the number of space sections present between the first position P1 and the vehicle 10 are detected from the captured image information acquired by the camera 30, and the previously stored length may be multiplied by each of the numbers.

The distance calculation unit 50 is configured to calculate the predetermined distance L1 required for the vehicle 10 in the period from the start of steering with a steering mechanism 64 to the start of crossing the lane mark LM. As described above, the predetermined distance L1 is obtained by multiplication of the vehicle speed V and the coefficient T (V×T). In the vehicle 10 that executes lane change by automatic control like this embodiment, steering is started with the steering mechanism 64 at a time point at which a lane change controller 58 outputs the lane change signal. As described above, the coefficient T is defined as the time required in the period from the start of the lane change (steering) by the vehicle 10 to the start of crossing the lane mark LM. In this embodiment, the coefficient T is the time required in the period from the output of the lane change signal from the lane change controller 58 to that the vehicle 10 starts crossing the lane mark LM.

The lane change determination unit 52 determines whether lane change is available or unavailable (described later) in lane keep control by a lane keep controller 56. The lane change determination unit 52 is configured to determine whether lane change is available or unavailable on the basis of the detection result of the lane mark LM by the camera 30 and the lane mark recognizer 42, and output a notification instruction based on the determination result to a notification mechanism 66. To be specific, the lane change determination unit 52 is configured to determine that the lane change is available if the type of the lane mark LM is the broken line LM2, and determine that the lane change is unavailable if the type of the lane mark LM is the solid line LM1. Also, if the type of the lane mark LM is switched at the first position P1, the lane change determination unit 52 is configured to determine whether the lane change is available or unavailable on the basis of the type of the lane mark LM ahead of the first position P1. Also, the lane change determination unit 52 is also configured to determine whether the lane change is available or unavailable on the basis of the detection result of the obstacle by the radars 32 and the obstacle recognizer 44. To be specific, the lane change determination unit 52 is configured to determine that the lane change is available if the obstacle is not present in the surrounding of the vehicle 10, and determine that the lane change is unavailable if the obstacle is present. Further, the lane change determination unit 52 is configured to determine whether or not the vehicle 10 has reached the second position P2 by comparing the distance D calculated by the vehicle position determination unit 48 with the predetermined distance L1 calculated by the distance calculation unit 50. Then, the lane change determination unit 52 is configured to output a notification instruction to the notification mechanism 66 at a time point at which the vehicle 10 has reached the second position P2.

The control unit 54 includes the lane keep controller 56 and the lane change controller 58. The lane keep controller 56 is configured to execute lane keep control to keep the distance between the vehicle 10 and the lane mark LM at a target distance on the basis of the vehicle information acquired by the vehicle information acquisition section 18 and the detection result of the lane mark LM by the camera 30 and the lane mark recognizer 42. The lane keep controller 56 is configured to start the lane keep control if the operation detection unit 46 detects the lane keep signal, and cancel the lane keep control if the operation detection unit 46 detects the cancel signal. The lane change controller 58 is configured to execute lane change control on the basis of the vehicle information acquired by the vehicle information acquisition section 18 if the operation detection unit 46 detects the lane change signal and the lane change determination unit 52 determines that the lane change is available.

The motion section 22 includes an acceleration mechanism 60, a brake mechanism 62, the steering mechanism 64, and the notification mechanism 66 that operate in accordance with control signals output from the automatic control ECU 20. The acceleration mechanism 60 includes a drive source, such as an engine or a motor, and a drive source ECU (either not shown). The drive source ECU causes the drive source to operate in accordance with an acceleration instruction output from the automatic control ECU 20. The brake mechanism 62 includes a brake and a brake ECU (either not shown). The brake ECU causes the brake to operate in accordance with a deceleration instruction output from the automatic control ECU 20. The steering mechanism 64 includes an electric power steering and a steering ECU (either not shown). The steering ECU causes a motor of the electric power steering to operate in accordance with a steering instruction output from the automatic control ECU 20. The notification mechanism 66 includes a notification device, such as a display and/or a loudspeaker, and a notification ECU (either not shown). The notification mechanism 66 causes the notification device to operate in accordance with a notification instruction output from the automatic control ECU 20.

2-2. Operation of Lane Change Assistance Device 12

This embodiment relates to travel assistance provided during the lane keep control. In particular, this embodiment relates to switching of notification about lane change availability at a position before the first position P1 at which the type of the lane mark LM is switched. First, lane keep control being a prerequisite for this embodiment, and lane change control in a normal section (a section in which the type of the lane mark LM is not switched) are briefly described.

In the lane change assistance device 12, the lane keep control is executed as follows. The driver operates the selector switch 34 when executing the lane keep control. The selector switch 34 outputs the lane keep signal to the automatic control ECU 20 in response to the operation by the driver. When the operation detection unit 46 detects the lane keep signal, the lane keep control by the lane keep controller 56 is started. The lane keep controller 56 executes the lane keep control on the basis of the vehicle information acquired by the vehicle information acquisition section 18 and the detection result of the lane mark LM by the camera 30. The vehicle 10 can control the vehicle speed V in accordance with an accelerator operation by the driver or can control the vehicle speed V at a constant speed by the lane keep controller 56 during the lane keep control. Also, the vehicle 10 can be controlled to follow a preceding vehicle on the basis of the detection result of the preceding vehicle by the surrounding information acquisition section 14 and the recognition unit 40.

In the lane change assistance device 12, the lane change control in a normal situation is executed as follows. During execution of the lane keep control, the driver may occasionally intend to change the lane. At this time, the driver operates the winker switch 36 in a direction in which the driver wants to change the lane. The winker switch 36 outputs the lane change signal in accordance with the operation by the driver. When the operation detection unit 46 detects the lane change signal and the lane change determination unit 52 determines that the lane change is available, the lane change controller 58 executes the lane change control.

Described next is switching processing of notification about lane change availability executed by the lane change assistance device 12 if the lane mark recognizer 42 recognizes that the type of the lane mark LM is switched at the first position P1, with reference to FIGS. 2, 3, and 4.

In step S1, the lane mark recognizer 42 recognizes the type of the lane mark LM ahead of the first position P1.

In step S2, the lane change determination unit 52 determines whether the lane change is available or unavailable at a position ahead of the first position P1 on the basis of the recognition result of the lane mark recognizer 42. As shown in FIG. 3, if the type of the lane mark LM ahead of the first position P1 is the broken line LM2, the lane change determination unit 52 determines that the lane change is available. As shown in FIG. 4, if the type of the lane mark LM ahead of the first position P1 is the solid line LM1, the lane change determination unit 52 determines that the lane change is unavailable.

In step S3, the distance calculation unit 50 multiplies the vehicle speed V detected by the vehicle speed sensor 38 by the predetermined coefficient T, and hence calculates the predetermined distance L1. As shown in FIGS. 3 and 4, the lane change determination unit 52 sets a position before (on the vehicle 10 side of) the first position P1 by the predetermined distance L1 as a second position P2.

In step S4, the vehicle position determination unit 48 calculates the position of the vehicle 10, or in this case, the distance D between the first position P1 and the vehicle 10, on the basis of the recognition result of the lane mark recognizer 42. The calculation of the distance D is continuously executed in the subsequent processing and later.

In step S5, it is determined whether or not the vehicle 10 has reached the second position P2. The lane change determination unit 52 compares the predetermined distance L1 calculated by the distance calculation unit 50 with the distance D calculated by the vehicle position determination unit 48. If the distance D is larger than the predetermined distance L1, the lane change determination unit 52 determines that the vehicle 10 has not reached the second position P2 (step S5: NO). For example, as shown in FIGS. 3 and 4, if the vehicle 10 travels at a third position P3 before the second position P2, the distance D is larger than the predetermined distance L1 (D>L1). At this time, the lane change determination unit 52 determines that the vehicle 10 has not reached the second position P2. In this case, the lane change determination unit 52 repeats the comparison between the distance D and the predetermined distance L1. If the driver performs the winker operation before the vehicle 10 reaches the second position P2, the lane change determination unit 52 determines whether the lane change is available or unavailable on the basis of the type of the lane mark LM before the first position P1. At this time, if the lane change determination unit 52 determines that the lane change is available, the lane change control by the lane change controller 58 is executed. If the lane change determination unit 52 determines that the lane change is unavailable, the lane change control is canceled.

In contrast, if the distance D is equal to or smaller than the predetermined distance L1, the lane change determination unit 52 determines that the vehicle 10 has reached the second position P2 (step S5: YES). For example, as shown in FIGS. 3 and 4, if the vehicle 10 travels at the second position P2, the lane change determination unit 52 determines that the vehicle 10 has reached the second position P2. In this case, the processing goes to step S6.

In step S6, the lane change determination unit 52 outputs the result of the determination of the lane change availability executed in step S2, as a notification instruction. For a specific example, as shown in FIG. 3, a case in which the lane mark LM ahead of the first position P1 is the broken line LM2 is described. The vehicle 10 reaches the second position P2 at a time point ta. The lane mark LM ahead of the first position P1 is the broken line LM2 across which the lane change is available. At this time, the lane change determination unit 52 outputs an ON signal as a notification instruction to the notification mechanism 66. The in-vehicle display (the notification mechanism 66) selects non-display of a mark 80 of "LCOK (lane change OK)" up to the time point ta (the second position P2); however, in response to the ON signal, the in-vehicle display switches the display state of the mark 80 from non-display to display. The mark 80 is an icon that notifies the driver about that the lane change is available. The driver recognizes that the lane change is available by display of the mark 80, and the driver can execute the lane change by automatic control by operating the winker switch 36. Also, the driver oneself can execute the lane change by manual control by operating the steering wheel.

For another specific example, as shown in FIG. 4, a case in which the lane mark LM ahead of the first position P1 is the solid line LM1 is described. The vehicle 10 reaches the second position P2 at a time point tb. The lane mark LM ahead of the first position P1 is the solid line LM1 across which the lane change is unavailable. At this time, the lane change determination unit 52 outputs an OFF signal as a notification instruction to the notification mechanism 66. The in-vehicle display (the notification mechanism 66) displays the mark 80 of "LCOK (lane change OK)" up to a time point tb (the second position P2); however, in response to the OFF signal, the in-vehicle display switches the display state of the mark 80 from display to non-display. The driver can recognize that the lane change is unavailable by non-display of the mark 80.

Figure 2:
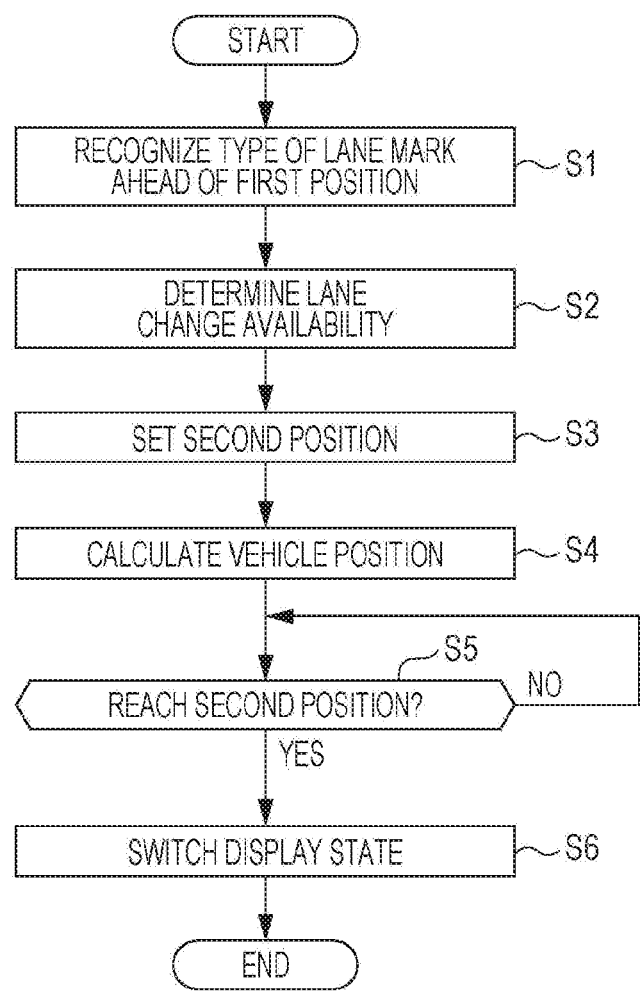
FIG. 2 is a flowchart of processing executed according to the first embodiment.

When the vehicle 10 passes through the first position P1, the processing shown in FIG. 2 is ended, and the processing goes to normal processing.

2-3. Summary of First Embodiment

The lane change assistance device 12 according to the first embodiment includes the surrounding information acquisition section 14 and the recognition unit 40 (the surrounding detection unit), the lane keep controller 56, the lane change determination unit 52, and the notification mechanism 66 (the notification unit). The surrounding information acquisition section 14 and the recognition unit 40 (the surrounding detection unit) detect the surrounding situation of the vehicle 10. The lane keep controller 56 executes the lane keep control on the basis of the detection result of the lane mark LM by the surrounding information acquisition section 14 and the recognition unit 40. The lane change determination unit 52 determines whether the lane change is available or unavailable on the basis of the detection result of the lane mark LM by the surrounding information acquisition section 14 and the recognition unit 40 during the lane keep control by the lane keep controller 56. The notification mechanism 66 (the notification unit) makes notification of the determination result by the lane change determination unit 52. Further, the surrounding information acquisition section 14 and the recognition unit 40 (the surrounding detection unit) detect the first position P1 (the change position) at which the type of the lane mark LM is switched. The lane change determination unit 52 outputs the determination result whether the lane change is available or unavailable on the basis of the type of the lane mark LM ahead of the first position P1 to the notification mechanism 66 (the notification unit) at the time point at which the vehicle 10 has reached a predetermined range between P1 and P2 including the first position P1 and extending toward the vehicle 10. The notification mechanism 66 makes notification of the determination result.

With the lane change assistance device 12 according to the first embodiment, the notification about whether the lane change is available or unavailable is made at a proper time point corresponding to switching of the type of the lane mark LM. For example, as shown in FIG. 3, if the type of the lane mark LM ahead of the first position P1 (the change position) is the broken line LM2, the notification about that the lane change is available is not made until a time point before the vehicle 10 enters the predetermined range between P1 and P2, and hence the driver does not perform an operation for the lane change. Then, the notification about that the lane change is available is made when the vehicle 10 enters the predetermined range between P1 and P2, and hence the driver can change the lane by automatic control or manual control according to the notification. Also, for example, as shown in FIG. 4, if the type of the lane mark LM ahead of the first position P1 (the change position) is the solid line LM1, the notification about that the lane change is available is made until the time point before the vehicle 10 enters the predetermined range between P1 and P2, and hence the driver can change the lane by automatic control or manual control according to the notification. Then, the notification about that the lane change is available is not made when the vehicle 10 enters the predetermined range between P1 and P2, and the driver does not perform the operation for the lane change. In this way, since the operation of the lane change can be made at a proper position, the driver no longer feels uncomfortable with the lane change motion.

To be more specific, the lane change determination unit 52 outputs the determination result whether the lane change is available or unavailable on the basis of the type of the lane mark LM ahead of the first position P1 to the notification mechanism 66 at the time point at which the vehicle 10 has reached the second position P2.

For example, as shown in FIG. 3, if the type of the lane mark LM ahead of the first position P1 is the broken line LM2, as long as the driver makes the lane change operation in response to the notification, the lane can be changed without a noticeable delay at the first position P1. Also, for example, as shown in FIG. 4, if the type of the lane mark LM ahead of the first position P1 is the solid line LM1, the driver can perform the lane change operation until the notification about that the lane change is available is no longer made. In this case, the lane can be changed up to a position immediately before the first position P1. Accordingly, the driver no longer feels uncomfortable with the lane change motion.

The lane change assistance device 12 further includes the vehicle speed sensor 38 that detects the vehicle speed V of the vehicle 10. The lane change determination unit 52 sets the second position P2 (L1=VT) in accordance with the vehicle speed V detected by the vehicle speed sensor 38. By setting the second position P2 in accordance with the vehicle speed V, the second position P2 can be accurately set.

3. Second Embodiment

As shown in FIGS. 3 and 4, the lane change assistance device 12 according to the first embodiment outputs the notification instruction to the notification mechanism 66 at the time point at which the vehicle 10 has reached the second position P2. In contrast, a lane change assistance device 12' according to a second embodiment outputs a notification instruction to the notification mechanism 66 before a vehicle 10' reaches the second position P2. However, even if the driver operates the winker switch 36 before the vehicle 10' reaches the second position P2, the lane change control is paused (on standby). Then, as shown in FIGS. 8 and 9, the lane change control based on the lane mark LM ahead of the first position P1 is executed at a time point at which the vehicle 10' has reached the second position.

3-1. Configuration of Lane Change Assistance Device 12'

Figure 5:
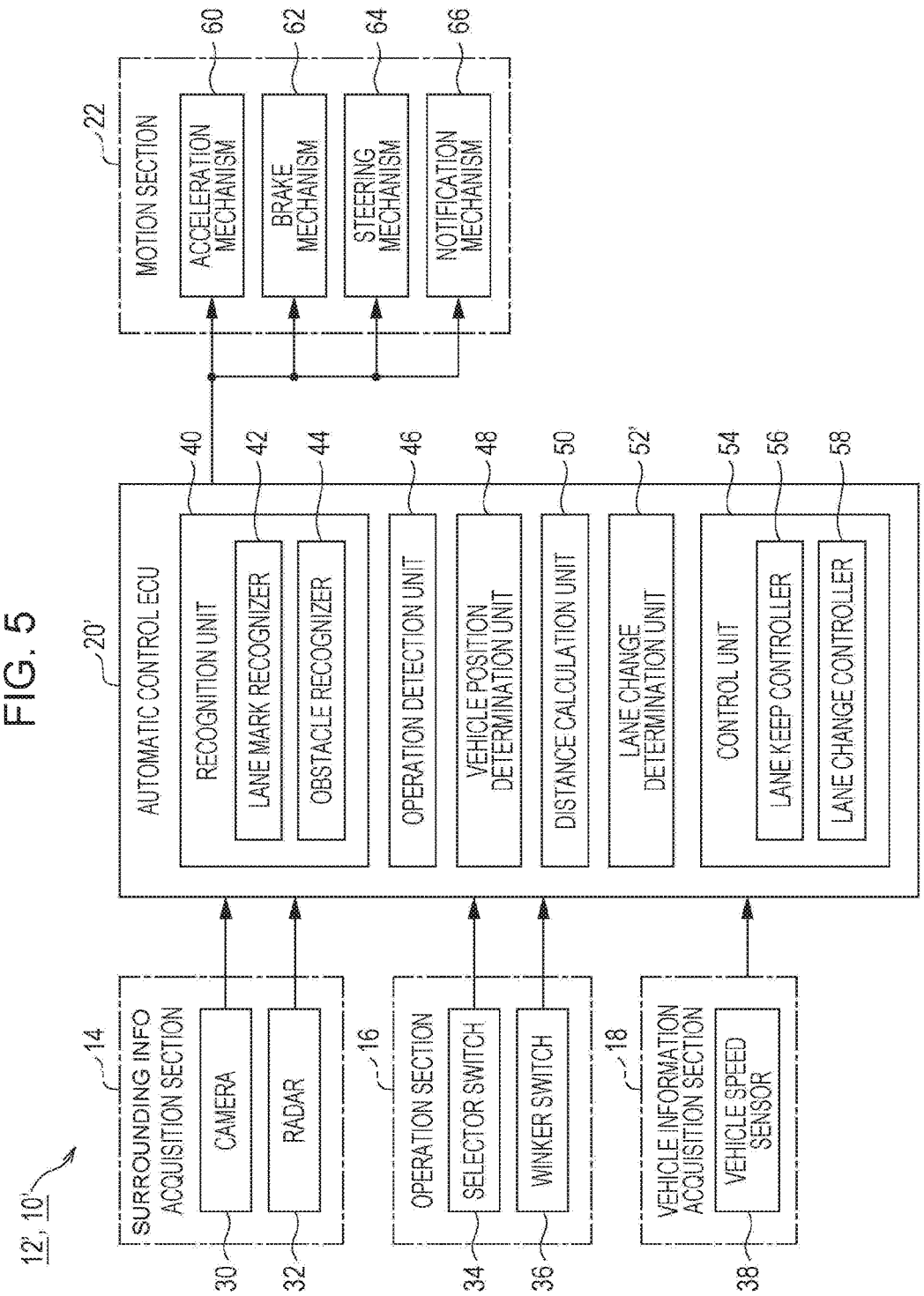
FIG. 5 is a block diagram of a lane change assistance device according to a second embodiment.

A configuration of the lane change assistance device 12' according to the second embodiment is described with reference to FIG. 5. The lane change assistance device 12' according to the second embodiment has configurations most of which are common to those of the lane change assistance device 12 according to the first embodiment. The same reference signs are applied to the common configurations, and the description thereof is omitted.

A configuration of the lane change assistance device 12' different from that of the lane change assistance device 12 is a lane change determination unit 52' of an automatic control ECU 20'. The lane change determination unit 52 is configured to determine whether the lane change is available or unavailable on the basis of the detection result of the lane mark LM, and output the notification instruction based on the determination result to the notification mechanism 66 at the time point at which the vehicle 10 has reached the second position P2. In contrast, the lane change determination unit 52' is configured to determine whether the lane change is available or unavailable on the basis of the detection result of the lane mark LM, and output the notification instruction based on the determination result to the notification mechanism 66 regardless of the travel position of the vehicle 10'. Also, if the type of the lane mark LM ahead of the first position P1 is the broken line LM2, and if the winker switch 36 is operated before the vehicle 10' reaches the second position P2, the lane change determination unit 52' is configured not to make an execution instruction for the lane change control, and make an execution instruction for the lane change control at the time point at which the vehicle 10' has reached the second position P2.

3-2. Operation of Lane Change Assistance Device 12'

Described next is automatic lane change processing executed by the lane change assistance device 12' if the lane mark recognizer 42 recognizes that the type of lane mark LM is switched at the first position P1, with reference to FIGS. 6, 7, 8, and 9.

In step S11, the lane mark recognizer 42 recognizes the type of the lane mark LM ahead of the first position P1.

In step S12, the type of the lane mark LM ahead of the first position P1 is determined. If the lane mark LM is the broken line LM2 (step S12: BROKEN LINE), the processing goes to step S13. If the lane mark LM is the solid line LM1 (step S12: SOLID LINE), the processing goes to step S21. In the following description, a series of processing if the lane mark LM is the broken line LM2 (step S13 to step S20) is described with reference to FIGS. 6 and 8, and then, a series of processing if the lane mark LM is the solid line LM1 (step S21 to step S28) is described with reference to FIGS. 7 and 9.

In step S13, the lane change determination unit 52' determines whether the lane change is available or unavailable at a position ahead of the first position P1 on the basis of the recognition result of the lane mark recognizer 42. In this case, as shown in FIG. 8, the type of the lane mark LM ahead of the first position P1 is the broken line LM2. The lane change determination unit 52' determines that the lane change is available.

In step S14, the lane change determination unit 52' outputs the determination result in step S12, that is, the determination result that the lane change is available, as an notification instruction. At this time, the lane change determination unit 52' outputs an ON signal as a notification instruction to the notification mechanism 66. In response to the ON signal, the in-vehicle display (the notification mechanism 66) displays a mark (not shown) of "LCOK."

In step S15, the distance calculation unit 50 multiplies the vehicle speed V detected by the vehicle speed sensor 38 by the predetermined coefficient T, and hence calculates the predetermined distance L1. As shown in FIG. 8, the lane change determination unit 52' sets a position before (on the vehicle 10' side of) the first position P1 by the predetermined distance L1 as a second position P2.

In step S16, the vehicle position determination unit 48 calculates the position of the vehicle 10', or in this case, the distance D between the first position P1 and the vehicle 10', on the basis of the recognition result of the lane mark recognizer 42. The calculation of the distance D is continuously executed in the subsequent processing and later.

In step S17, the presence of the lane change operation by the driver is determined. If the driver intends to change the lane by automatic control, the driver performs a lane change operation by using the winker switch 36. If the operation detection unit 46 does not detect the lane change signal output in response to the operation of the winker switch 36 (step S17: NO), the processing goes to step S18. In contrast, if the operation detection unit 46 detects the lane change signal (step S17: YES), the processing goes to step S19.

Figure 6:
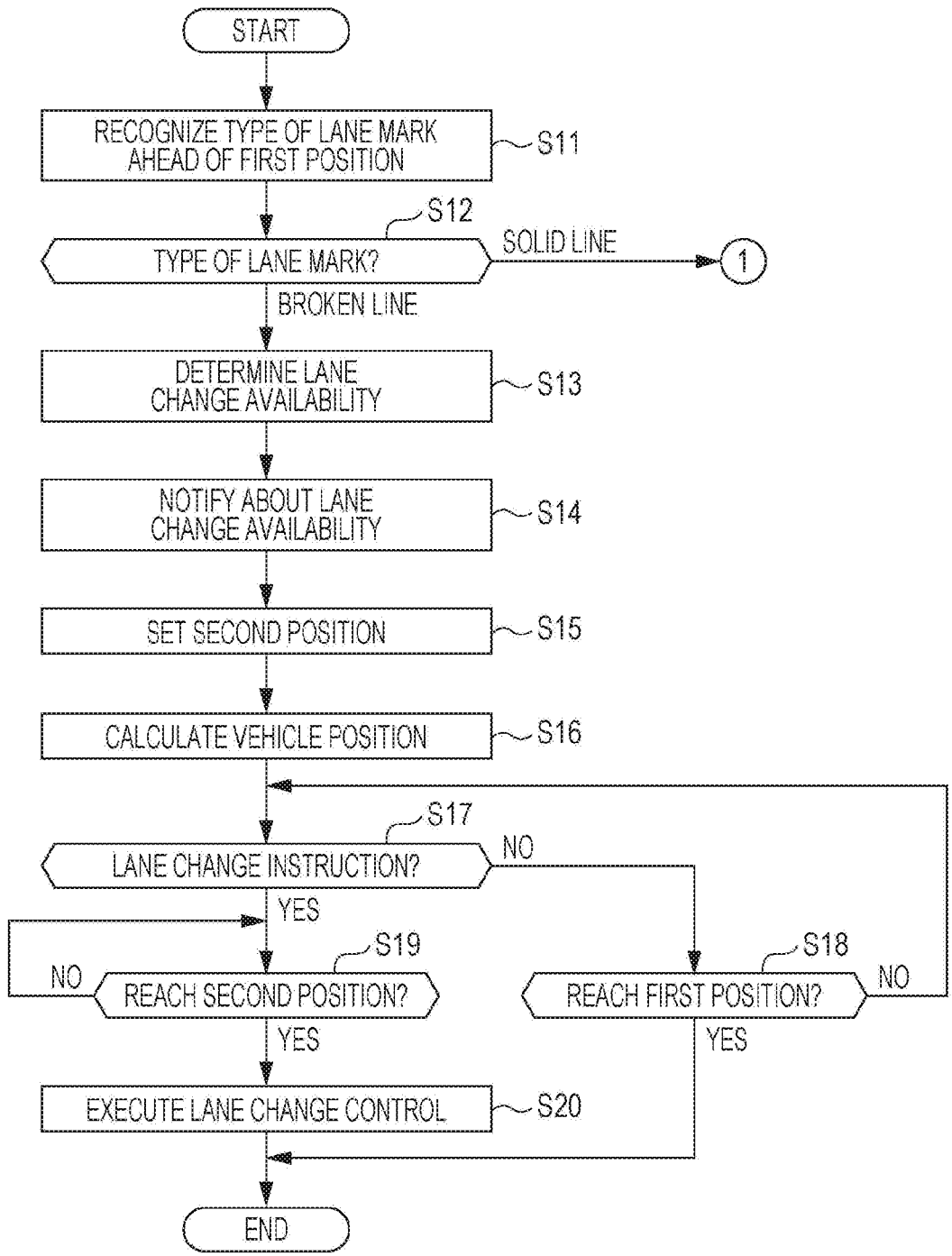
FIG. 6 is a flowchart of processing executed according to the second embodiment.

In step S18, it is determined whether or not the vehicle 10' has reached the first position P1. The lane change determination unit 52' determines that the vehicle 10' has not reached the first position if the distance D is larger than zero (step S18: NO). In this case, the processing returns to step S17. In contrast, the lane change determination unit 52' determines that the vehicle 10' has reached the first position if the distance D is equal to or smaller than zero (step S18: YES). In this case, the processing shown in FIG. 6 is ended, and the processing goes to the normal processing.

In step S19, it is determined whether or not the vehicle 10' has reached the second position P2. The lane change determination unit 52' compares the predetermined distance L1 calculated by the distance calculation unit 50 with the distance D calculated by the vehicle position determination unit 48. If the distance D is larger than the predetermined distance L1, the lane change determination unit 52' determines that the vehicle 10' has not reached the second position P2 (step S19: NO). For example, as shown in FIG. 8, if the vehicle 10' travels at a third position P3 before the second position P2, the distance D is larger than the predetermined distance L1 (D>L1). At this time, the lane change determination unit 52' determines that the vehicle 10' has not reached the second position P2. In this case, the lane change determination unit 52' repeats the comparison between the distance D and the predetermined distance L1. In contrast, if the distance D is equal to or smaller than the predetermined distance L1, the lane change determination unit 52' determines that the vehicle 10' has reached the second position P2 (step S19: YES). For example, as shown in FIG. 8, if the vehicle 10' travels at the second position P2, the lane change determination unit 52' determines that the vehicle 10' has reached the second position P2. In this case, the processing goes to step S20.

In step S20, the lane change control by automatic control is executed. As shown in FIG. 8, the vehicle 10' reaches the second position P2 at a time point tc. At the second position P2 and a position ahead of the second position P2, the lane change determination unit 52' determines that the lane change is available on the basis of the broken line 1242 ahead of the first position P1. At this time point, the lane change determination unit 52' determines that the lane change is available for the lane change controller 58. The lane change controller 58 outputs a steering instruction signal to the steering mechanism 64 in accordance with the determination result of the lane change determination unit 52'. The steering ECU controls the motor of the electric power steering and starts steering in response to the steering instruction signal. As shown in FIG. 8, if the lane change control is started at the second position P2, the vehicle 10' starts crossing the lane mark LM at the first position P1. Although not shown, if the lane change control is started at a position ahead of the second position P2, the vehicle 10' starts crossing the lane mark LM at a position ahead of the first position P1. At a position before the second position P2 (the third position P3 or the like), the lane change determination unit 52' determines that the lane change is unavailable for the lane change controller 58. Owing to this, the lane change controller 58 does not output the steering instruction signal to the steering mechanism 64.

Figure 7:
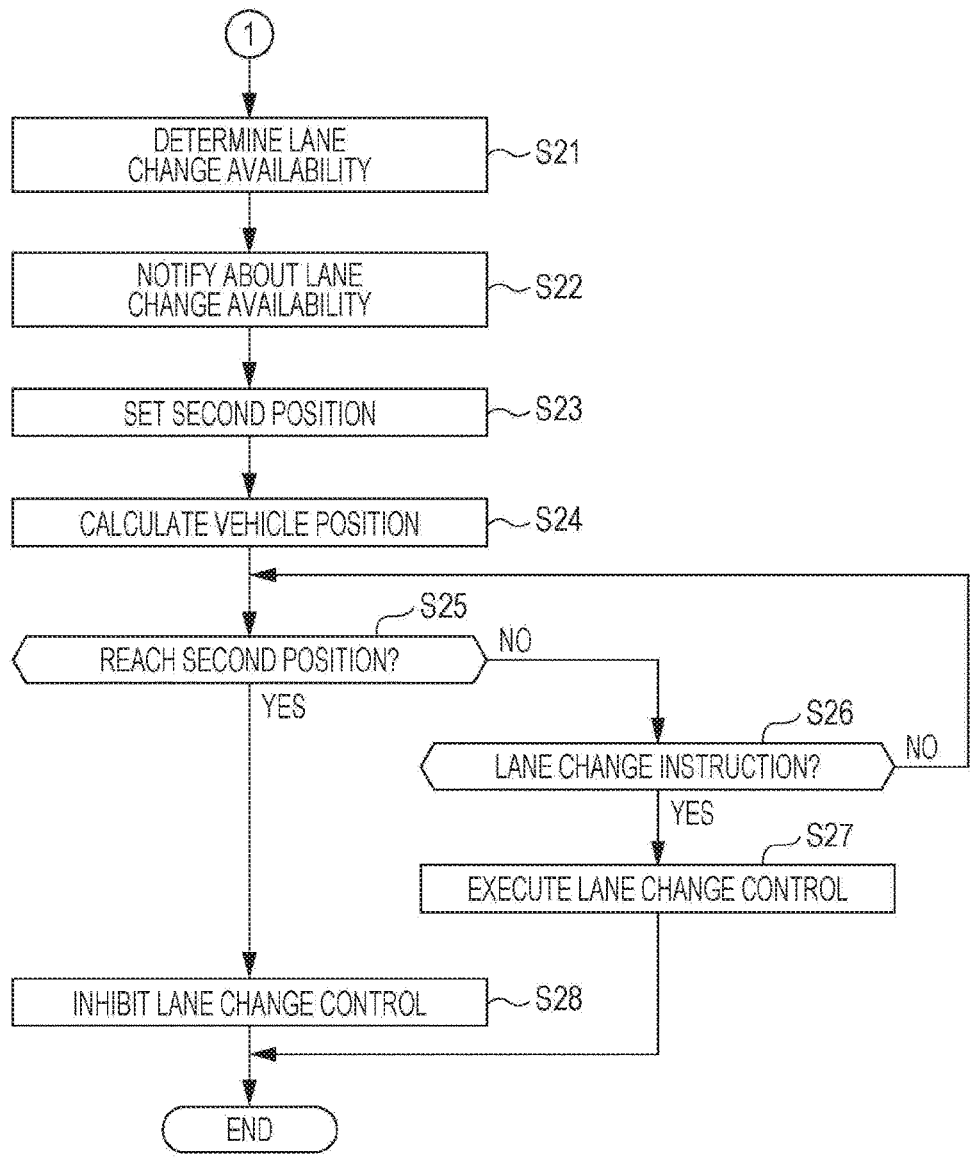
FIG. 7 is a flowchart of processing executed according to the second embodiment.

Next, processing if the lane mark LM is determined as the solid line LM1 in step S12 is described with reference to FIG. 7. Part of the processing shown in FIG. 7 is common to part of the processing shown in FIG. 6. Hence, the following description partly overlaps the above description.

In step S21, the lane change determination unit 52' determines whether the lane change is available or unavailable at a position ahead of the first position P1 on the basis of the recognition result of the lane mark recognizer 42. In this case, as shown in FIG. 9, the type of the lane mark LM ahead of the first position P1 is the solid line LM1. The lane change determination unit 52' determines that the lane change is unavailable.

In step S22, the lane change determination unit 52' outputs the determination result in step S21, that is, the determination result that the lane change is unavailable, as an notification instruction. At this time, the lane change determination unit 52' outputs an OFF signal as a notification instruction to the notification mechanism 66. In response to the OFF signal, the in-vehicle display (the notification mechanism 66) does not display the mark (not shown) of "LCOK."

In step S23, the distance calculation unit 50 multiplies the vehicle speed V detected by the vehicle speed sensor 38 by the predetermined coefficient T, and hence calculates the predetermined distance L1. As shown in FIG. 9, the lane change determination unit 52' sets a position before (on the vehicle 10' side of) the first position P1 by the predetermined distance L1 as a second position P2.

In step S24, the vehicle position determination unit 48 calculates the position of the vehicle 10', or in this case, the distance D between the first position P1 and the vehicle 10', on the basis of the recognition result of the lane mark recognizer 42. The calculation of the distance D is continuously executed in the subsequent processing and later.

In step S25, it is determined whether or not the vehicle 10' has reached the second position P2. The lane change determination unit 52' compares the predetermined distance L1 calculated by the distance calculation unit 50 with the distance D calculated by the vehicle position determination unit 48. If the distance D is larger than the predetermined distance L1, the lane change determination unit 52' determines that the vehicle 10' has not reached the second position P2 (step S25: NO). For example, as shown in FIG. 9, if the vehicle 10' travels at a third position P3 before the second position P2, the distance D is larger than the predetermined distance L1 (D>L1). At this time, the lane change determination unit 52' determines that the vehicle 10' has not reached the second position P2. In this case, the processing goes to step S26. In contrast, if the distance D is equal to or smaller than the predetermined distance L1, the lane change determination unit 52' determines that the vehicle 10' has reached the second position P2 (step S25: YES). For example, as shown in FIG. 9, if the vehicle 10' travels at the second position P2, the lane change determination unit 52' determines that the vehicle 10' has reached the second position P2. In this case, the processing goes to step S28.

In step S26, the presence of the lane change operation by the driver is determined. If the type of the lane mark LM up to the first position P1 is the broken line LM2 and if the vehicle 10' has not reached the second position P2, the lane change is allowed. If the driver intends to change the lane by automatic control, the driver performs a lane change operation by using the winker switch 36. If the operation detection unit 46 does not detect the lane change signal output in response to the operation of the winker switch 36 (step S26: NO), the processing returns to step S25. In contrast, if the operation detection unit 46 detects the lane change signal (step S26: YES), the processing goes to step S27.

In step S27, the lane change control by automatic control is executed. At a position before the second position P2, the lane change determination unit 52' determines that the lane change is available on the basis of the broken line LM2 before the first position P1. The lane change determination unit 52' determines that the lane change is available for the lane change controller 58. The lane change controller 58 outputs a steering instruction signal to the steering mechanism 64 in accordance with the determination result of the lane change determination unit 52'. The steering ECU controls the motor of the electric power steering and starts steering in response to the steering instruction signal.

If it is determined that the vehicle 10' has reached the second position P2 in step S25 described above, the processing in step S28 is executed. In step S28, the lane change control by automatic control is inhibited. As shown in FIG. 9, the vehicle 10' reaches the second position P2 at a time point td. At the second position P2 and a position ahead of the second position P2, the lane change determination unit 52' determines that the lane change is unavailable on the basis of the solid line LM1 ahead of the first position P1. Owing to this, if the operation detection unit 46 detects the lane change signal output in response to the operation of the winker switch 36, the lane change control is not executed.

3-3. Summary of Second Embodiment

The lane change assistance device 12' according to the second embodiment includes the surrounding information acquisition section 14 and the recognition unit 40 (the surrounding detection unit), the lane keep controller 56, the lane change determination unit 52', and the lane change controller 58. The surrounding information acquisition section 14 and the recognition unit 40 (the surrounding detection unit) detect the surrounding situation of the vehicle 10'. The lane keep controller 56 executes the lane keep control on the basis of the detection result of the lane mark LM by the surrounding information acquisition section 14 and the recognition unit 40. The lane change determination unit 52' determines whether the lane change is available or unavailable on the basis of the detection result of the lane mark LM by the surrounding information acquisition section 14 and the recognition unit 40 during the lane keep control by the lane keep controller 56. The lane change controller 58 executes the lane change control if the lane change determination unit 52' determines that the lane change is available. Further, the surrounding information acquisition section 14 and the recognition unit 40 (the surrounding detection unit) detect the first position P1 (the change position) at which the type of the lane mark LM is switched. If the lane change determination unit 52' determines that the lane change is available on the basis of the type of the lane mark LM ahead of the first position P1, the lane change controller 58 starts the lane change control at the time point at which the vehicle 10' has reached the predetermined range between P1 and P2 including the first position P1 and extending toward the vehicle 10. In contrast, if the lane change determination unit 52' determines that the lane change is unavailable on the basis of the type of the lane mark LM ahead of the first position P1, the lane change controller 58 does not execute the lane change control at the time point at which the vehicle 10' has reached the predetermined range between P1 and P2 including the first position P1.

With the lane change assistance device 12 according to the second embodiment, the lane change control is executed at a proper time point corresponding to switching of the type of the lane mark LM. For example, if the type of the lane mark LM ahead of the first position P1 (the change position) is the broken line LM2, the lane change control is not executed although the lane change operation is performed before the vehicle 10' enters the predetermined range between P1 and P2. Then, if the vehicle 10' enters the predetermined range between P1 and P2, the lane change control is executed. Also, for example, if the type of the lane mark LM ahead of the first position P1 (the change position) is the solid line LM1, the lane change control is executed as long as the lane change operation is performed before the vehicle 10' enters the predetermined range between P1 and P2. Then, if the vehicle 10' enters the predetermined range between P1 and P2, the lane change control is not executed although the lane change operation is performed. In this way, since the lane change control is executed or no longer executed at a proper position, the driver no longer feels uncomfortable with the lane change motion.

To be more specific, if the lane change determination unit 52' determines that the lane change is available on the basis of the type of the lane mark LM ahead of the first position P1, the lane change controller 58 starts the lane change control at the time point at which the vehicle 10' has reached the second position P2. Also, if the lane change determination unit 52' determines that the lane change is unavailable on the basis of the type of the lane mark LM ahead of the first position P1, the lane change controller 58 does not execute the lane change control at the time point at which the vehicle 10' has reached the second position P2.

For example, as shown in FIG. 8, if the type of the lane mark LM ahead of the first position P1 is the broken line LM2, the lane can be changed without a noticeable delay at the first position P1. Also, for example, as shown in FIG. 9, if the type of the lane mark LM ahead of the first position P1 is the solid line LM1, the lane can be changed up to a position immediately before the first position P1. Accordingly, the driver no longer feels uncomfortable with the lane change motion.

The lane change assistance device 12' further includes the vehicle speed sensor 38 that detects the vehicle speed V of the vehicle 10'. The lane change determination unit 52' sets the second position P2 (L1=VT) in accordance with the vehicle speed V detected by the vehicle speed sensor 38. By setting the second position P2 in accordance with the vehicle speed V, the second position P2 can be accurately set.

The lane change assistance device 12' further includes the operation detection unit 46 that detects the lane change operation performed by the driver. If the operation detection unit 46 detects the lane change operation and the lane change determination unit 52' determines that the lane change is available on the basis of the type of the lane mark LM ahead of the first position P1, the lane change controller 58 starts the lane change control at the time point tc at which the vehicle 10' has reached the second position P2. With this configuration, even if the vehicle change operation is performed before the vehicle 10' reaches the second position P2, the lane change control is not executed. Then, the lane change control is executed at the time point tc at which the vehicle 10' has reached the second position P2. In this way, since the lane change control is executed at a proper position, the driver no longer feels uncomfortable with the lane change motion.

4. Modifications

The first and second embodiments can be modified in various ways. For example, the coefficient T used for calculating the predetermined distance L1 is the constant value in the first and second embodiments; however, may be a value set in accordance with the distance between the vehicle 10, 10' and the lane mark LM.

The position of the first position P1 may be acquired by, for example, road-vehicle communication (beacon or the like). The position of the vehicle 10, 10' may be measured by, for example, a global positioning system (GPS or the like) or an autonomous navigation device (gyroscope).

The notification of the lane change availability is executed by the in-vehicle display in the first and second embodiments; however, the notification of the lane change availability may be executed by, for example, sound or vibration. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A lane change assistance device comprising:
    a surrounding detector that detects a surrounding situation of a vehicle;
    a lane keep controller that executes lane keep control by using a detection result of a lane mark by the surrounding detector;
    a lane change determination controller that determines whether lane change is available or unavailable by using the detection result of the lane mark by the surrounding detector during the lane keep control by the lane keep controller; and
    a notification device that makes notification of a determination result by the lane change determination controller,
    wherein the surrounding detector detects a change position at which a type of the lane mark is switched from one to another at a time when the change position is located in a traveling direction of the vehicle and distanced from the vehicle, and
    wherein the lane change determination controller outputs a determination result whether the lane change is available or unavailable by using the type of the lane mark ahead of the change position to the notification device at a time point at which the vehicle has reached a predetermined range including the change position and extending toward the vehicle with respect to the traveling direction of the vehicle.

2. The lane change assistance device according to claim 1, wherein the change position is a first position, and a position closer to the vehicle than the first position by a predetermined distance is a second position, and
    wherein the lane change determination controller outputs the determination result whether the lane change is available or unavailable by using the type of the lane mark ahead of the first position to the notification unit at a time point at which the vehicle has reached the second position.

3. The lane change assistance device according to claim 2, further comprising:
    a vehicle speed sensor that detects a vehicle speed of the vehicle,
    wherein the lane change determination controller sets the second position in accordance with the vehicle speed detected by the vehicle speed sensor.

4. The lane change assistance device according to claim 3, wherein the predetermined distance between the first position and the second position is a smallest distance for the vehicle to start the lane change to reach the lane mark located between a currently traveling lane and an adjacent lane with the detected vehicle speed.

5. The lane change assistance device according to claim 4, wherein the lane change determination controller does not output the determination result that the lane change is available to the notification unit until the vehicle reaches the second position.

6. A lane change assistance device comprising:
    a surrounding detector that detects a surrounding situation of a vehicle;
    a lane keep controller that executes lane keep control by using a detection result of a lane mark by the surrounding detector;
    a lane change determination controller that determines whether lane change is available or unavailable by using the detection result of the lane mark by the surrounding detector during the lane keep control by the lane keep controller; and
    a lane change controller that executes lane change control if the lane change determination controller determines that the lane change is available,
    wherein the surrounding detector detects a change position at which a type of the lane mark is switched from one to another at a time when the change position is located in a traveling direction of the vehicle and distanced from the vehicle, and
    wherein, if the lane change determination controller determines that the lane change is available by using the type of the lane mark ahead of the change position, the lane change controller starts the lane change control at a time point at which the vehicle has reached a predetermined range including the change position and extending toward the vehicle with respect to the traveling direction of the vehicle, and in contrast, if the lane change determination controller determines that the lane change is unavailable by using the type of the lane mark ahead of the change position, the lane change controller does not execute the lane change control at the time point at which the vehicle has reached the predetermined range including the change position.

7. The lane change assistance device according to claim 6, wherein the change position is a first position, and a position closer to the vehicle than the first position by a predetermined distance is a second position, and
wherein, if the lane change determination controller determines that the lane change is available by using the type of the lane mark ahead of the first position, the lane change controller starts the lane change control at a time point at which the vehicle has reached the second position, and in contrast, if the lane change determination controller determines that the lane change is unavailable by using the type of the lane mark ahead of the first position, the lane change controller does not execute the lane change control at the time point at which the vehicle has reached the second position.

8. The lane change assistance device according to claim 7, further comprising:
a vehicle speed sensor that detects a vehicle speed of the vehicle,
wherein the lane change determination controller sets the second position in accordance with the vehicle speed detected by the vehicle speed sensor.

9. The lane change assistance device according to claim 8, wherein the predetermined distance between the first position and the second position is a smallest distance for the vehicle to start the lane change to reach the lane mark located between a currently traveling lane and an adjacent lane with the detected vehicle speed.

10. The lane change assistance device according to claim 9, wherein the lane change controller does not start the lane change control until the vehicle reaches the second position.

11. The lane change assistance device according to claim 9, further comprising:
an operation detector that detects a lane change operation performed by a driver,
wherein, if the operation detector detects the lane change operation and if the lane change determination controller determines that the lane change is available by using the type of the lane mark ahead of the first position, the lane change controller does not start the lane change control until the vehicle reaches the second position.

12. The lane change assistance device according to claim 7, further comprising:
an operation detector that detects a lane change operation performed by a driver,
wherein, if the operation detector detects the lane change operation and if the lane change determination controller determines that the lane change is available by using the type of the lane mark ahead of the first position, the lane change controller starts the lane change control at the time point at which the vehicle has reached the second position.

13. A lane change assistance method comprising steps of:
detecting, by a computer, a surrounding situation of a vehicle;
executing, by the computer, lane keep control by using a detection result of a lane mark in the detecting step;
determining, by the computer, whether lane change is available or unavailable by using the detection result of the lane mark during executing the lane keep control, and making notification of a determination result,
wherein the detecting step detects a change position at which a type of the lane mark is switched from one to another at a time when the change position is located in a traveling direction of the vehicle and distanced from the vehicle, and
wherein the determining step notifies the determination result whether the lane change is available or unavailable by using the type of the lane mark ahead of the change position at a time point at which the vehicle has reached a predetermined range including the change position and extending toward the vehicle with respect to the traveling direction of the vehicle.

14. The lane change assistance method according to claim 13,
wherein the change position is a first position, and a position closer to the vehicle than the first position by a predetermined distance is a second position, and
wherein the determining step notifies the determination result whether the lane change is available or unavailable by using the type of the lane mark ahead of the first position at a time point at which the vehicle has reached the second position.

15. The lane change assistance method according to claim 14, further comprising:
detecting, by a vehicle speed sensor, a vehicle speed of the vehicle,
wherein the second position is set in accordance with the vehicle speed detected by the vehicle speed sensor.

16. A lane change assistance method comprising steps of:
(i) detecting, by a computer, a surrounding situation of a vehicle;
(ii) executing, by the computer, lane keep control by using a detection result of a lane mark in the detecting step;
(iii) determining, by the computer, whether lane change is available or unavailable by using the detection result of the lane mark during executing the lane keep control; and
(iv) executing, by the computer, lane change control if the determining step determines that the lane change is available,
wherein the detecting step (i) detects a change position at which a type of the lane mark is switched from one to another at a time when the change position is located in a traveling direction of the vehicle and distanced from the vehicle, and
wherein, if the determining step (iii) determines that the lane change is available by using the type of the lane mark ahead of the change position, the executing step (iv) starts the lane change control at a time point at which the vehicle has reached a predetermined range including the change position and extending toward the vehicle with respect to the traveling direction of the vehicle, and in contrast, if the determining step (iii) determines that the lane change is unavailable by using the type of the lane mark ahead of the change position, the executing step (iv) does not execute the lane change control at the time point at which the vehicle has reached the predetermined range including the change position.

17. The lane change assistance method according to claim 16, wherein the change position is a first position, and a position closer to the vehicle than the first position by a predetermined distance is a second position, and wherein, if the determining step (iii) determines that the lane change is available by using the type of the lane mark ahead of the change position, the executing step (iv) starts the lane change control at a time point at which the vehicle has reached the second position, and in contrast, if the determining step (iii) determines that the lane change is unavailable by using the type of the lane mark ahead of the change position, the executing step (iv) does not execute the lane change control at the time point at which the vehicle has reached the second position.

18. The lane change assistance method according to claim 17, further comprising:

detecting, by a vehicle speed sensor, a vehicle speed of the vehicle, wherein the second position is set in accordance with the vehicle speed detected by the vehicle speed sensor.

* * * * *